(12) United States Patent
Mumford et al.

(10) Patent No.: US 6,427,000 B1
(45) Date of Patent: Jul. 30, 2002

(54) PERFORMING AUTOMATED TESTING USING AUTOMATICALLY GENERATED LOGS

(75) Inventors: Gregory Mumford, Marion, IA (US); Don Stock, McLean, VA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/406,911

(22) Filed: Sep. 24, 1999

Related U.S. Application Data (62) Division of application No. 08/933,776, filed on Sep. 19, 1997, now Pat. No. 6,192,108.

(51) Int. Cl.[7] .......................... H04M 1/24; H04M 3/08; H04M 3/22
(52) U.S. Cl. ................. 379/9; 379/9.01; 379/10.03; 703/26; 706/920; 714/38
(58) Field of Search .................. 714/25, 26, 32, 714/33, 38, 48; 379/1.01, 9, 9.01, 9.04, 14, 10.01, 10.02, 10.03, 15.01, 15.03, 29.08; 703/23, 26, 27; 706/920

(56) References Cited

U.S. PATENT DOCUMENTS

| | | | |
|---|---|---|---|
| 4,648,044 A | 3/1987 | Hardy et al. | 364/513 |
| 5,572,570 A | 11/1996 | Kuenzig | 379/1 |
| 5,633,909 A | 5/1997 | Fitch | 379/15 |
| 5,754,760 A * | 5/1998 | Warfield | 395/183.14 |
| 5,809,108 A | 9/1998 | Thompson et al. | 379/15 |
| 5,822,397 A | 10/1998 | Newman | 379/6 |
| 5,822,401 A | 10/1998 | Cave et al. | 379/34 |
| 5,933,485 A | 8/1999 | Coleman | 379/9 |
| 6,192,108 B1 | 2/2001 | Mumford et al. | 379/1 |

* cited by examiner

*Primary Examiner*—Binh Tieu (57) ABSTRACT

The present invention performs automated testing on service applications using automatically generated logs, so that new testing applications do not need to be created for each new release of a service application. The invention further provides for testing of all aspects of the service application by accounting for all data and processes performed, and does so without interfering with the processing of the service application. An Automated Regression Tester (ART) captures and records data generated by the execution of an initial version of a service application. This data is recorded to a first test log. When a new or ported version of that service application is developed, the first test log is used by the ART to generated output that emulates the operating environment, including caller and user input, of the service application. The processing of the new/ported version of the service application is captured and recorded to a second test log. The ART then compares the second test log to the first test log and reports any discrepancies in data. Such discrepancies may indicate a bug in the new/ported version of the service application.

6 Claims, 5 Drawing Sheets

PERFORMING AUTOMATED TESTING USING AUTOMATICALLY GENERATED LOGS

This application is a divisional of Application No. 08/933,776, filed Sep. 19, 1997, now Pat. No. 6,192,108.

TECHNICAL FIELD

The present invention is directed to the field of testing computer programs, and, more specifically, to automated testing.

BACKGROUND OF THE INVENTION

Call centers have become a popular means for providing operator and customer services for businesses. A call center is a logical organization of telephony resources that serves as a focal point for receiving customers' telephone calls and for providing manual or automatic services to callers in response to such calls. A service may be, for example, operator services provided by a phone company for special feature calls, or customer services provided by a manufacturing company for a product they offer.

In many call centers, computers, often in the form of operator consoles and audio response units, are used to automate many services. Service applications are software programs that run on these computers and provide automated services. Like other software programs, these service applications are continuously under development and require frequent testing. Each new service or product offered, or enhancement to an existing service or product, requires that new versions of each application that runs on call center computers be developed and tested. One necessary component of testing includes regression testing. Testing a new version of a service application involves testing the functions performed by previous versions and is called "regression testing."

For example, if a service application is executed on an operator console to process a collect call, and a new feature is added to the collect calling service, then a new version of the service application must be developed that provides the new feature. In addition to testing for the capabilities required for the new feature, this new version must also undergo regression testing to ensure that it can correctly provide the features provided by the previous version, since it would not be acceptable for the new version to function properly in servicing the new feature of the collect calling service, but fail in servicing the existing features.

Conventional methods for regression testing of new service applications require that a new testing system be developed for each new version or "release," of an application, which can quickly become very cumbersome and expensive. Other conventional regression testing methods record user input and screen displays of applications in process, and then replay these for new releases to regression test. However, these testing applications are generally intrusive, interrupting the processing of the service application at various points. Also, because these testing limitations are limited to recording user input and screen displays, they could not capture many kinds of data and processes that were vital to complete testing, such as background processing, database queries, and internal data writes.

SUMMARY OF THE INVENTION

The present invention performs automated testing of service applications using automatically generated logs, so that new testing applications need not be created for each new release of a service application. Additionally, as a distinct improvement over conventional testing techniques, the invention tests all aspects of the service application by accounting for all data and processes performed, and does so without interrupting the processing of the service application.

An Automated Regression Tester (ART) provides a toolkit in the form of an Application Program Interface (API) that can be used to build testing capabilities into the service application itself. The API is a group of functions called by the service application to report all of the data and activities generated during the processing of the service application. This API records this information to a test log for comparison to the data and activities generated when processing the same call with a new version of the service application.

When a new service application is first developed, it is loaded and executed on the computer (such as an operator console or audio response unit (ARU)) for which it is designed. The service application processes a call from the time a call reaches a call center to the time the call is released from the call center and the operator console or ARU creates a billing record for the call.

While processing a call, the service application performs various related activities, such as displaying screens prompting the user (i.e., operator) for input; reading input from the user, the caller and the network; performing function calls; interfacing with external systems; and creating and writing to data records. The user or tester performs call processing functions as would be done for an actual call in a production environment. These functions include, for example, placing a live call to the operator console or ARU over an actual network and entering input at the operator console.

Throughout this entire process, the service application, through the API provided by the present invention, records to a test log all the data and activities generated by the service application and its environment. The information recorded includes caller input, operator input, background processing, and network data generation. This log represents a test scenario, and provides the input that will be needed to test future versions of the service application under the same test scenario. Several different test logs, representing different test scenarios, may be generated for a service application's processing of a single type of call. The different test logs generated may represent the different ways a call can be handled, and/or different points of failure in the call flow.

When a new version of the service application has been developed, to add a feature to the current version or to port the current version to another computer system or operating system, for example, the ART can automatically apply the test logs generated in response to user interaction against the new version of the service application to regression test the new version. The new version of the service application and the ART are executed on separate components of the call center. The ART automatically dials a call to the operator console or ARU, using data from the test log. The ART then begins interacting with the service application that is running on the operator console or ARU, and emulates all environmental processes, including caller, operator, and network input. The ART again logs the output of the service application that is produced by the API inserted into the service application, and produces a second test log representing the processing of the new version of the service application.

The ART can then compare the second test log with the first test log and determine if the new version performed in the same manner as the old version. Any discrepancies will be due to either a bug in the new version, or an intended change in functionality in the new version that would not be reflected in the first test log. These discrepancies are presented in a report to the user or tester, who can then determine whether any bugs exist in the new version. Any discrepancies due to an intended change in functionality in the new version are easily identified. The user or tester can then record new data over these discrepancies to create a new test log that can be used for regression testing on yet future versions.

DETAILED DESCRIPTION OF THE INVENTION

The present invention performs automated testing on service applications using automatically generated logs, so that new testing applications do not need to be created for each new release of a service application. The invention further provides for testing of all aspects of the service application by accounting for all data and processes performed, and does so without interfering with the processing of the service application. An Automated Regression Tester (ART) captures and records data generated by the execution of an initial version of a service application in response to user interaction. This data is recorded to a first test log. When a new or ported version of that service application is developed, the first test log is used by the ART without actual user interaction to generate output that emulates the operating environment, including caller and user input, of the service application. The processing of the new/ported version of the service application is captured and recorded to a second test log. The ART then compares the second test log to the first test log and reports any discrepancies in data. Such discrepancies may indicate a bug in the new/ported version of the service application.

Figure 1:
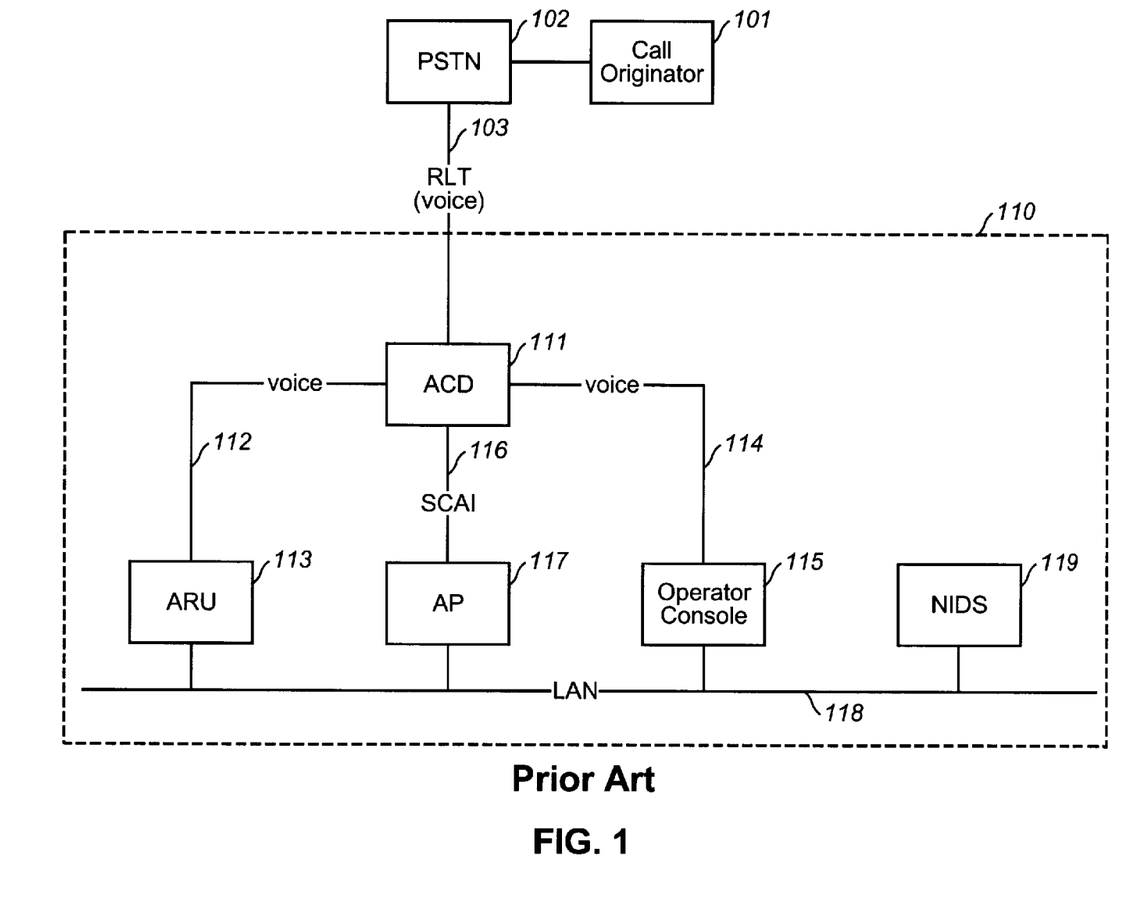
FIG. 1 is a telephone network diagram that illustrates a conventional architecture of a call center used to provide customer and operator services.

FIG. 1 is a telephone network diagram that illustrates a conventional architecture of a call center 110 used to provide customer and operator services. A Call Originator 101 accesses the call center 110 via the Public Switched Telephone Network (PSTN) 102. An Automated Call Distributor (ACD) 111 receives the call from the PSTN 102 via a Release Link Trunk (RLT) 103. RLTs are provided by certain digital switches in the telecommunications industry, and are commonly used to link ACDs at call centers with switches in the PSTN.

The ACD 111 then distributes the call to either an Audio Response Unit (ARU) 113 or an Operator Console 115. ARUs are also referred to as integrated voice response units (IVRs) or voice response units (VRUs). Call distribution is controlled by an Application Processor (AP) 117. An AP 117 is an computer adjunct to the ACD 111, and is used to perform call processing functions for the ACD 111. Use of the AP 117 to perform call processing functions for the ACD 111 allows the ACD 111 resources to be dedicated to switching, thereby increasing the call capacity of the ACD 111. The AP 117 determines where the call should be routed based on the dialed number, ANI of the caller, and possibly other criteria.

There are generally a plurality of ARUs 113 and Operator Consoles 115 for servicing the calls. An ARU 113 will generally be designed to perform the same service applications as the Operator Console 115 in an automated manner. The Operator Consoles 115 are manned with operators.

The ARUs 113, Operator Consoles 115, and AP 117 are linked via common LAN 118, such as an Ethernet LAN, which provides communications among these components for several purposes. In alternative preferred embodiments, the LAN may be replaced with a wide area network (WAN) or other data link. The AP 117, when it receives a query for call routing from the ACD 111, may need to determine which Operator Console 115 or ARU 113 is available to take the call. In order to track Operator Console 115 and ARU 113 availability, the AP 117 must be able to determine when an Operator Console 115 or ARU 113 has completed processing a call. When a call is transferred from an ARU 113 to an Operator Console 115, the Operator Console 115 queries the ARU 113 for call context information. These and other functions are performed over the LAN 118.

The call center 110 may also contain a Network Information Data Server (NIDS) 119, which is connected to the other call center components by the LAN 118. The NIDS 119 is a database server or file server used to store and retrieve various data, such as customer accounts and network records.

Figure 2:
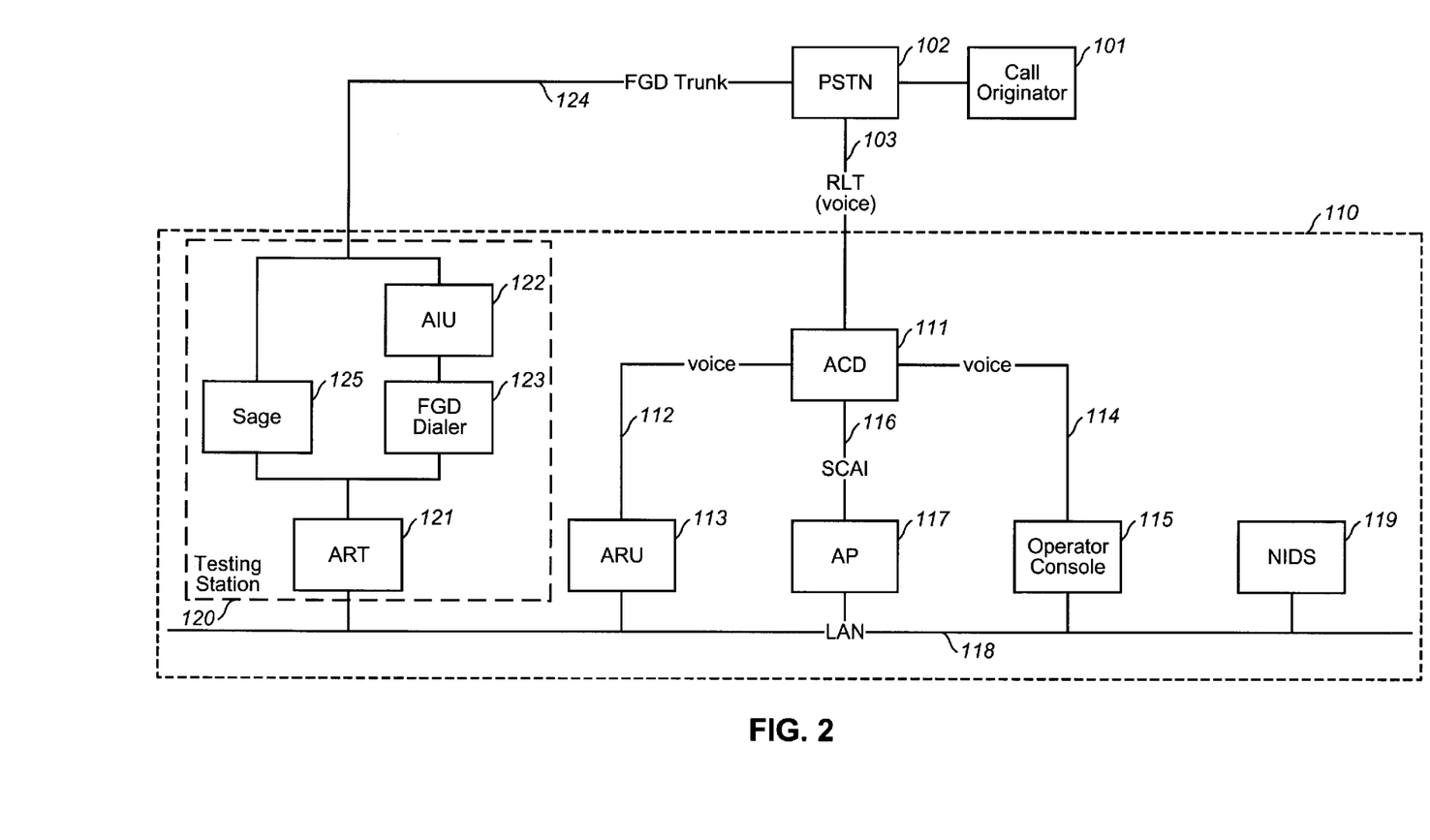
FIG. 2 is a telephone network diagram that illustrates the incorporation of the Automated Regression Tester in the call center shown in FIG. 1.

FIG. 2 is a telephone network diagram that illustrates the incorporation of the ART 121 in the call center 110 shown in FIG. 1. The ART 121 can be virtually any type of computer, and is preferably a personal or mid-range server grade computer. For example, a Pentium or 486 microprocessor may be used to perform the functions implemented in the ART 121.

The ART 121 is an automated regression tester that tests the service applications of the ARU 113 and Operator Console 115. ART 121 verifies that each version of the ARU 113 and Operator Console 115, when executed, produces the same output as previous versions. The ART 121 performs this verification function by capturing data from different versions of the ARU 113 and Operator Console 115 during call processing, and verifying that both sets of data match. Unlike traditional testers that require a user-written program or script for each test case, ART 121 generates test cases automatically during call processing.

The primary functions of the present invention are performed by the ART 121. The other functions of the present invention are built into the service applications themselves, which are performed by the ARUs 113 and Operator Consoles 115. Additional support code executed on the ARUs 113 and Operator Consoles 115 allows the ARUs 113 and Operator Consoles 115 to be synchronized with one of two modes of the ART 121. The first such mode is a "Create" mode, in which the ART 121 records in a first test log all of the operating data generated by the service application. In the "Create" mode, the service application is tested in response to actual user interaction; that is, it interacts with its actual environment, including a user (operator), caller, and the network. The second mode is a "Read/Create" mode, and is used to cause the service application to interact with the ART 121, using data from the test log, as well as cause the ART 121 to record all data generated by the service application into a second test log. In "Read/Create" mode, the service application is operated automatically, interacting with the ART 121, without further user interaction.

The ART 121 is linked to the PSTN 102 via FGD trunk 124. In alternative embodiments, other signaling apparatus may be substituted for the FGD trunk. This allows the ART 121 to place outbound calls to the PSTN 102, which are then routed to the call center 110 and the ARUs 113 and Operator Consoles 115. Such outbound calls emulate actual calls made to the call center 110, and allow the ART 121 to test processing of a live call by the service application. These testing calls may be routed to any number of ARUs 113 or operator consoles 115 as part of the normal process of handling the call. For instance, a testing call may be routed from a first ARU to an operator console, and from the operator console to a second ARU. Similarly, a testing call may be routed from a first operator console to a second operator console.

When developing a service application, an application programmer incorporates API calls in the service application that cause specified data to be recorded to a first test log. In a first preferred embodiment, application programmers incorporate calls to APIs specifically designed for recording data in a test log. In a second preferred embodiment, application programmers incorporate calls to commonly-used high-level APIs not specifically directed to recording data to a test log. The implementations of these high-level APIs, in turn, cause data to be recorded to the appropriate test log. In accordance with the second embodiment, application programmers need not take any special action in order to develop an application compatible with the invention. The recorded data may include a function that is called, data that was passed in or out, user input, caller input, background processing, or various other sorts of data used or processes performed. The data that is captured represents a particular callflow for a particular type of call. This call flow can be used to recreate a test scenario to regression test new or ported versions of the service application. The test logs in which service application data is recorded are preferably kept in the ART 121, but may also be kept in the NIDS 119.

Once the user has processed a call and the test log has been automatically generated by the ART 121, that test log can then be used to place a call automatically without further user interaction. The test log serves as a set of instructions for the ART 121 to place a call. The test log may be recorded in any of a wide range of formats. The ART 121 places an outbound call to the call center 110 via the FGD trunk 124 to the PSTN 102. The call is received by the ACD 111 and routed to an Operator Console 115 or ARU 113 in precisely the same way that a live call is handled. At the Operator Console 115 or ARU 113, the call is processed by the service application. The service application prompts the ART 121 for input, as it would a caller. The ART 121 provides the input, as specified in the test log, as would a live caller. The service application then processes the input. The service application may also prompt the operator for input. This input is provided automatically by the ART 121 via messaging over the LAN 118. Other activities performed by service application interfaces are emulated by the ART 121.

During this processing, the ART 121 records data from the service application processing, as specified in the service application itself using the present invention's API. This data is recorded to a second test log in the ART 121. The result is a second test log, which ART 121 can compare to the first. If there are any differences between the contents of the two test logs, the ART 121 displays a message that the test has failed, and shows the precise record and field in the logs that differ, as well as what the different values are. This information can be used to determine the exact point at which the test failed.

Figure 3:
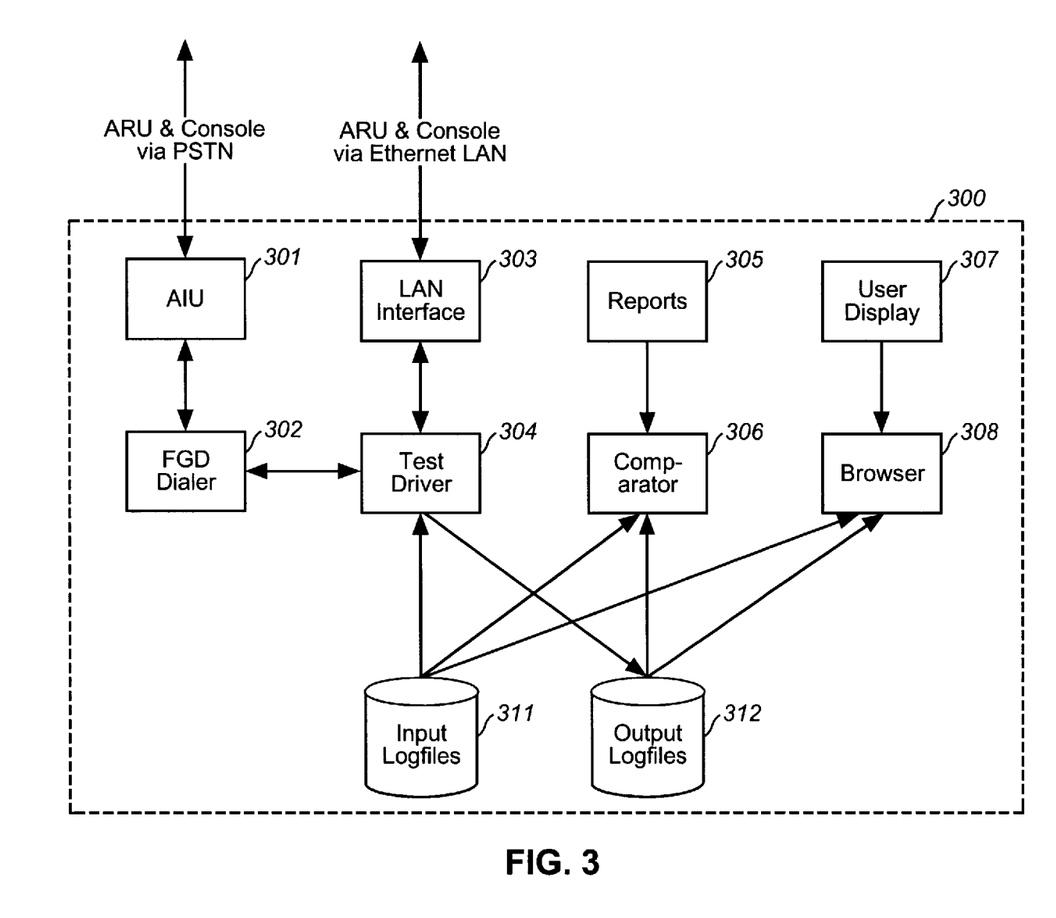
FIG. 3 illustrates the logical configuration of the ART in the preferred embodiment.

FIG. 3 illustrates the logical configuration of the Automated Tester in the preferred embodiment. In the preferred embodiment, the ART 121 is a personal or mid-range computer, with a standard architecture comprising a CPU, RAM, hard disk, system bus, and one or more disk drives. FIG. 3 illustrates the logical components that are realized by the software that runs on the ART 121.

A Test Driver performs the main functionality of the ART 121. When the ART 121 is enabled, the Test Driver interfaces with the ARUs 113 and Operator Consoles 115 via a LAN Interface, and the LAN 118 shown in FIG. 2. The LAN 118 Interface is simply a data network communications package, standard in the industry, for interfacing the ART 121 computer with whatever LAN 118 is used in the call center 110.

The ART 121 is part of a larger Testing Station 120. In the Testing Station 120, the ART is connected to the FGD trunk 124 both by an FGD Dialer 123 and an Audio Interface Unit (AIU) 122, and by a Sage Communications Test Set ("Sage") 125. The AIU 122 is a card inserted in the ART 121 computer that provides a telephony audio interface to the PSTN 102 by generating dialing tones and recording and playing back audio signals. The FGD Dialer 123 performs outbound calling functions, such as seizing the FGD trunk 124 via off-hook, outpulsing the digits of a specified dialstring, and sending DTMF tones to emulate a live caller. The FGD Dialer 123 is activated by the Test Driver. The Sage can also perform these outbound calling functions, and can further accept calls from ARUs and the consoles. Both the Sage 125 and the FGD Dialer 123 can further play standardized, replicable voice scripts, such as the name of a collect caller or the word "hello," in response to user input. These voice scripts may be used to exercise voice recognition functionality of an ARU, or to provide a prompt for the operator of a console.

The ART 121 has, or has access to, a database of test logfiles. Logfiles are preferably kept on the ART 121 for performance reasons, but may be kept on an external component, such as the NIDS 119, as storage capacity requirements dictate. The database contains logfiles that can be used as both input and output to the Test Driver. When initially recording the performance of a first version of a service application, the Test Driver writes the data generated to an Output Logfile. When regression testing a new or ported version of the service application, the Test Driver uses the previously recorded Output Logfile as an Input Logfile. The Input Logfile provides the data that the Test Driver will use to emulate a callflow. This data is used to initiate and execute a live call to an ARU 113 or Operator Console 115 via the FGD Dialer 123, AIU 122, FGD trunk 124, and PSTN 102. This data is also used to send messages to an ARU 113 or Operator Console 115 via the LAN 118, messages emulating background processing, operator input, network input, screen displays, remote function calls, and all other activities not performed by the live caller.

Also during regression testing, the Test Driver writes the data generated to a second test log, which can be compared to the first test log to determine if the new or ported version of the service application performs as expected.

This comparison is performed by a Comparator process in the ART 121. The Comparator reads the first test log (the "Input Logfile") and the second test log (the "Output Logfile") that were used in a particular instance of regression testing, compares the data in each, and identifies differences between them. Each difference in the comparator will be due to either a bug in the new version of the service application, or a new feature of the new version of the service application that was not part of the old version, and is therefore not accounted for in the first test log.

The Comparator's results are provided in a Report to the user. The user can determine, from the data in the Report, which discrepancies are due to bugs, then fix those bugs. For discrepancies due to new features in the new version, the user can run the service application again in manual mode, and record a new test log that will account for each new feature.

Figure 4:
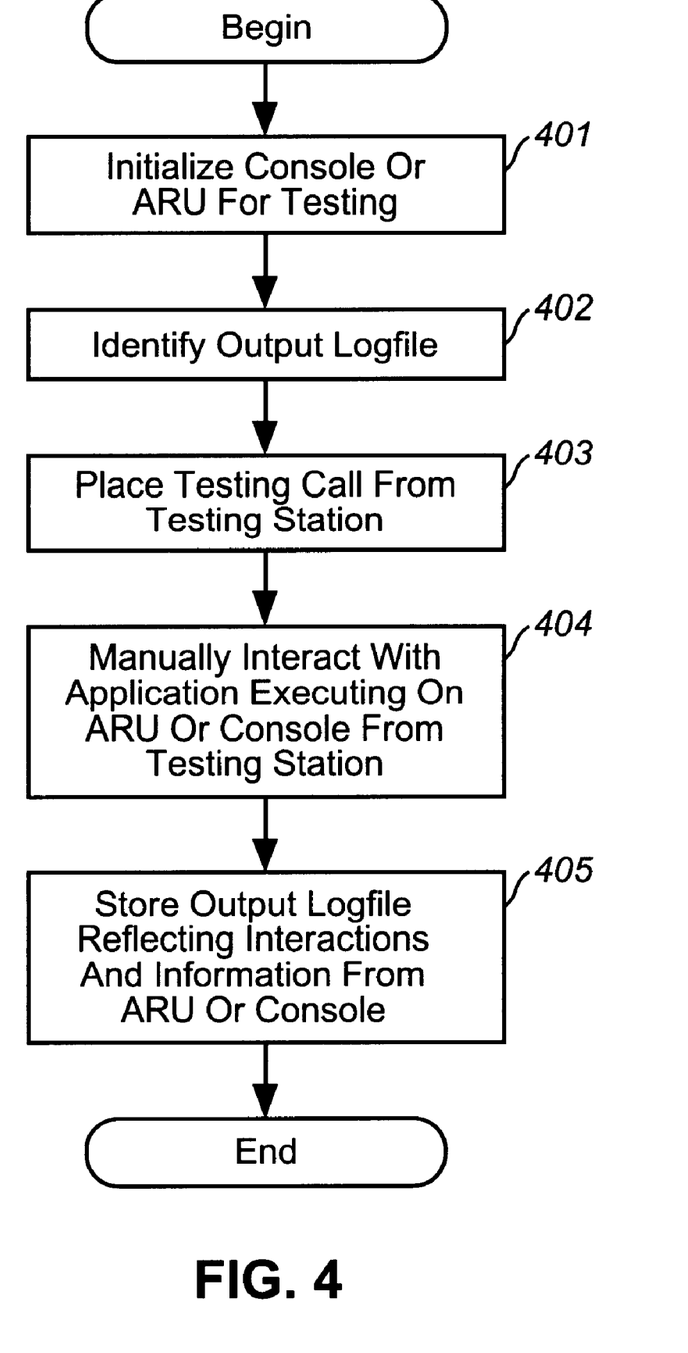
FIG. 4 is a flow diagram showing the steps preferably performed by the ART in order to perform manual testing.

FIG. 4 is a flow diagram showing the steps preferably performed by the ART 121 in order to perform manual testing. Manual testing tests an application executing on one or more ARUs 113 and/or on one or more operator consoles 115 using tester input. In step 401, the ART 121 initializes the operator console 115 or ARU 113 for testing. In step 402, the ART 121 identifies the output logfile in which to store information describing the manual testing session, preferably based upon user input. In step 403, the ART 121 places a testing call to the ACD 111 via the PSTN 102 using other Testing Station 120 components, either the FGD dialer 123 and ATU 122 or the Sage 125. In step 404, the ART 121 permits the tester to manually interact with the application executing either on the ARU 113 or the console from the Testing Station 120 to provide caller input. These manual interactions preferably exercise all of the existing features of the application being tested. In step 405, when the manual interactions conclude, the ART 121 stores the output logfile, which reflects all of the manual interactions performed in step 404, as well as information received from the ARU 113 or operator console 115 indicating the processing done by the application in response to the interactions. After step 405, these steps conclude.

The operation of these steps is illustrated in the example that follows. Table 1 below shows sample logfile contents for testing a service application for verifying and completing calling card calls. Each line of Table 1 corresponds to an entry in the logfile, originated either by the ART or the console (or ARU).

TABLE 1

| entry number | originator | entry |
| --- | --- | --- |
| 1 | ART | wait for console to log in |
| 2 | console | logged in |
| 3 | ART | go off hook |
| 4 | ART | dial 18009501022 |
| 5 | console | INFO: received call |
| 6 | console | INFO: identified call as a calling card call |
| 7 | console | COMMAND: ready to collect 10 digit calling card number |
| 8 | ART | dial 1234567890 |
| 9 | console | INFO: collected calling card number digits 1234567890 |
| 10 | console | COMMAND: ready to collect 4 digit PIN number |
| 11 | ART | dial 1234 |
| 12 | console | INFO: collected PIN digits 1234 |
| 13 | console | INFO: card was valid |

TABLE 1-continued

| entry number | originator | entry |
| --- | --- | --- |
| 14 | console | INFO: PIN was valid |
| 15 | console | INFO: completed call |

The logfiles shown in Table 1 would be generated during manual testing as follows. Entry 1, originated by the ART, indicates that the ART is waiting for an operator to log in to the console so that testing can begin. Entry 2, originated by the console, indicates that an operator has logged in. Entry 3, originated by the ART, indicates that the FGD dialer has "gone off hook" to obtain a line from the FFGD trunk to carry the testing call. Entry 4, originated by the ART, indicates that the ART has dialed the testing call based on input from the tester. Entry 5, originated by the console, indicates that the testing call was received by the console. Entry 6, originated by the console, indicates that the console has identified the testing call as a calling card call. Entry 7, originated by the console, indicates that the service application is ready to receive a ten-digit calling card number. Entry 8, originated by the ART, indicates that the ART has used the FGD dialer to dial a ten-digit calling card number provided to the ART by the tester. Entry 9, originated by the console, indicates that this calling card number was received by the console. Entry 10, originated by the console, indicates that the service application is now ready to receive a four-digit PIN number. Entry 11, originated by the ART, indicates that the ART has used the FGD dialer to dial a four-digit PIN number supplied by the tester. Entry 12, originated by the console, indicates that the service application has received the four-digit PIN number. Entry 13, originated by the console, indicates that the received calling card number was valid. Entry 14, originated by the console, indicates that the four-digit PIN was valid. Entry 15, originated by the console, indicates that the console thereafter completed the calling card call.

This logfile, generated automatically via user interaction, specifies the proper operations to be performed by the service application in response to the caller input events also listed in the logfile. After the service application is subsequently revised, this logfile can both be used to recreate the user input used to test the service application, and to analyze the performance of the service application to determine whether the revised service application is performing as required.

Figure 5:
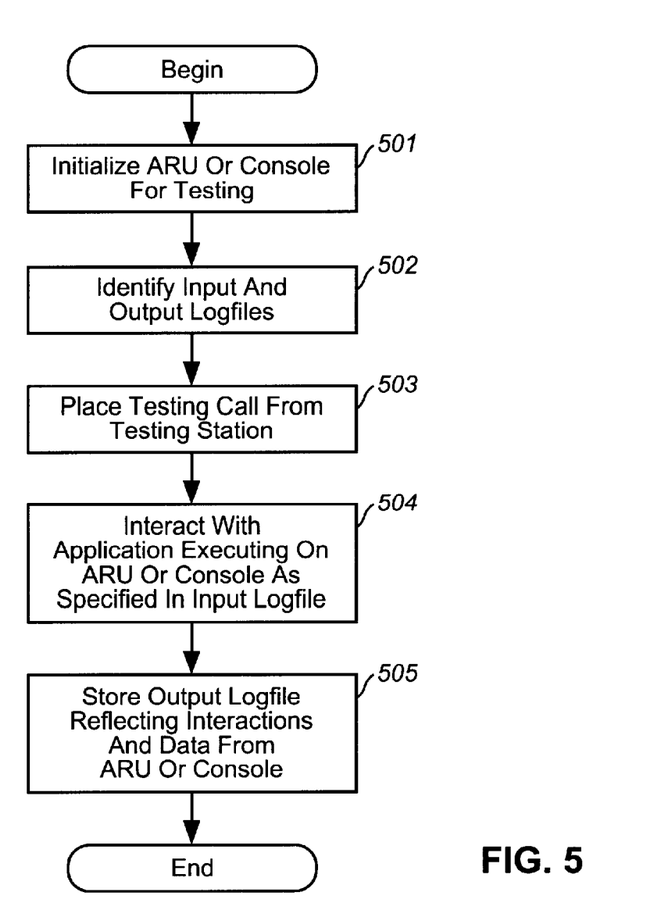
FIG. 5 is a flow diagram showing the steps preferably performed by the ART in order to perform automatic testing.

FIG. 5 is a flow diagram showing the steps preferably performed by the ART 121 in order to perform automatic testing. Automatic testing tests an application executing either on an ARU 113 or on a operator console 115 using recorded input from a previous logfile. In step 501, the ART 121 initializes the operator console 115 or ARU 113 for testing. In step 502, the ART 121 identifies the input file from which to obtain simulated caller input, preferably based upon user input. In step 503, the ART 121 places a testing call to the ACD 111 via the PSTN 102 using other components of the Testing Station 120, either the FGD dialer 123 and AIU 122 or the Sage 125. In step 504, the ART 121 automatically interacts with the application executing either on the ARU 113 or the console from the ART 121 by simulating the caller input events recorded in the input logfile. These automatic interactions are preferably coordinated with the tested application's processing using synchronization signals sent to the ART by the console or ARU to indicate that the application is ready for more caller input.

In step 505, when the manual interactions conclude, the ART 121 stores the output logfile, which reflects all of the manual interactions performed in step 504, as well as information received from the ARU 113 or operator console 115 indicating the processing done by the application in response to the interactions. After step 505, these steps conclude.

As an example of the automated testing procedure, the logfile in Table 1 is used as the input logfile, and a similar or identical output logfile is generated if the revised service application is still performing as required. The logfile in Table 1 is used in the automated testing process as follows. Generally, automated testing proceeds in the same manner as manual testing with input events generated by the ART and service application events originated by the console or ARU all being written to an output logfile. Automated testing differs from manual testing in that the user input provided by the tester during manual testing is automatically provided by the ART based on the input logfile in automated testing. Thus, entries 3, 4, 8, and 11 are used by the ART to go offhook, dial a calling card call, dial a ten-digit calling card number, and dial a four-digit PIN automatically. The ART preferably synchronizes the synthesized input events with the processing of the service application in the case of entries 8 and 11 by waiting for the COMMAND messages from the console indicating that the service application is ready for additional caller input. These COMMAND messages are the subject of entries 7 and 10.

Figure 6:
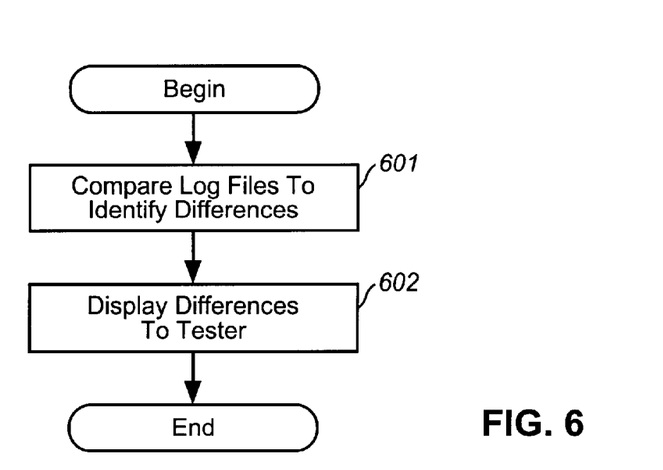
FIG. 6 is a flow diagram showing the steps preferably performed by the ART in order to identify different results between two iterations of regression testing.

FIG. 6 is a flow diagram showing the steps preferably performed by the ART in order to identify different results between two iterations of regression testing. In step 601, the ART compares the two successive logfiles to identify differences between the logfiles. In step 602, the ART displays the differences to the tester, so that the tester may determine whether the differences are the result of features added while revising the application or bugs. If the tester concludes that the errors resulted from bugs in the new version, these bugs can be remedied.

To assist the user in the above functions, a Browser is used to provide views of Input Logfiles and Output Logfiles to a User Display. Via a User Display, such as a monitor, and the Browser, a user can read the various logfiles.

It can be desirable during a Read/Create mode test to use a different call string than was used when the input logfile was created. For example, there may be a different terminating number, or maybe a different 800 number is being used for an 800PIN call, which means that both the 800 number and probably its PIN are different. Rather than rerun each test case in Create mode, much time can be saved by overriding the call strings that have changed and telling the Comparator not to compare call strings. A Call String Override window is provided by the present invention for this purpose.

The Call String Override window is used to specify both the new call strings and an identifying label for each. There are predefined labels that specify ART 121 Main window input fields, and user-defined labels that are used by the Test Driver to determine when to override a call string from an input logfile. When the test case is begun, any call strings with predefined labels are used to place the call and appear in ART 121 Main window fields. During the call, the Test Driver searches the input logfile for matching user-defined labels. When a matching user-defined label is found, the Test Driver substitutes the new call string from the Call String Override window.

In a further preferred embodiment of the invention, the Comparator and Browser of the ART 121 use an adapter table to distinguish between differences in form and differences in content between two logfiles. The structure and format of data records contained in logfiles are subject to change between different versions of the ARU 113 and Console. This means that both the Browser and the Comparator must be able to correctly interpret different versions of data records.

Because of this, logfile record formats are stored as data tables in a file. These data tables are called adapter tables because they make it possible for the Browser and the Comparator to adapt to changing record formats.

An added benefit of using adapter tables is that the output of both the Browser and the Comparator can be customized by the user without changing any code. The adapter tables fully describe each data record, and any or all of that information can be modified.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A computer network for testing an application program, the computer network comprising an application program computer system for executing the application program;

a testing computer system; and an information interchange network between the application program computer system and the testing computer system, the information interchange network for conveying input events from the testing computer system to the application program executing on the application program computer system in response to contents of a source testing log accessible from the testing computer system, the information interchange network further for conveying to the testing computer system from the application program computer system application response events, the application response events including both application response events identifying actions taken by the application program in response to input events and application response events indicating that the application program is ready to receive an input event, and wherein input events are generated by the testing computer system in response to receiving in the testing computer system application response events indicating that the application program is ready to receive an input event; and a storage device connected to the testing computer system for storing a target testing log containing both the input events conveyed from the testing computer system to the application computer system and the application response events conveyed from the application computer system to the testing computer system.

2. A method in a computer system for providing automated testing of a computer program using a testing computer program, the method comprising the steps of:

under the control of the testing program, reading from an input testing log a plurality of indications of input events;

for the first input event indication read from the input testing log, simulating for the tested program the indicated input event;

under the control of the tested program, in response to an input event simulated by the testing program, performing one or more operations to process the simulated input event;

providing to the testing program an indication of the operations performed;

providing to the testing program an indication that the tested program is ready to process another input event;

under the control of the testing program, in response to receiving the indication of the operations performed and the indication that the tested program is ready to process another input event, storing in an output testing log the indication of the simulated input event, the indication of the operations performed, and the indication that the tested program is ready to process another input event; and for the next input event indication read from the input testing log, simulating for the tested program the indicated input event.

3. The method of claim 2 wherein the tested program performs the providing steps by calling application programming interfaces whose implementations provide indications of operations performed and indications that the tested program is ready to process another event.

4. The method of claim 2, further comprising the steps of, before the reading step:

under the control of the testing program, soliciting from a user a sequence of input events;

conveying the input events to the tested program;

storing indications of the conveyed input events in the input testing log;

under the control of the tested program, for each conveyed input event:

performing one or more operations to process the input event;

providing to the user feedback based on the performed operations;

providing to the testing program an indication of the operations performed; and under the control of the testing program, p2 storing in the input testing log the indication of the operations performed provided by the tested program.

5. The method of claim 4, further including the step of comparing the output testing log to the input testing log to determine whether operations performed by the tested program in response to the input events has changed.

6. The method of claim 5 wherein the comparing step includes the step of analyzing each difference between the output testing log and the input testing log to determine whether the difference results from different formats of the two testing logs.

* * * * *